(12) United States Patent
Gormish et al.

(10) Patent No.: US 8,291,315 B2
(45) Date of Patent: Oct. 16, 2012

(54) STANDARDIZED NETWORK ACCESS TO PARTIAL DOCUMENT IMAGERY

(75) Inventors: Michael Gormish, Redwood City, CA (US); Edward Schwartz, Sunnyvale, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 1361 days.

(21) Appl. No.: 11/365,550

(22) Filed: Feb. 28, 2006

(65) Prior Publication Data
US 2007/0204210 A1 Aug. 30, 2007

(51) Int. Cl.
G06F 17/00 (2006.01)
G06F 15/00 (2006.01)

(52) U.S. Cl. ........ 715/248; 382/232; 382/240; 345/428; 345/619; 345/426

(58) Field of Classification Search .................. 382/232; 345/428, 619, 426
See application file for complete search history.

(56) References Cited

U.S. PATENT DOCUMENTS

| | | | | |
|---|---|---|---|---|
| 6,489,936 B1 * | 12/2002 | Gormish | .......................... | 345/2.1 |
| 6,577,714 B1 * | 6/2003 | Darcie et al. | ................ | 379/93.17 |
| 7,659,894 B2 * | 2/2010 | Keller et al. | ................... | 345/426 |
| 2002/0091665 A1 * | 7/2002 | Beek et al. | ......................... | 707/1 |
| 2003/0135649 A1 * | 7/2003 | Buckley et al. | ................ | 709/247 |
| 2004/0078491 A1 * | 4/2004 | Gormish et al. | ................ | 709/247 |
| 2004/0114814 A1 * | 6/2004 | Boliek et al. | ................... | 382/233 |
| 2004/0146199 A1 * | 7/2004 | Berkner et al. | ................ | 382/176 |
| 2004/0175047 A1 * | 9/2004 | Gormish et al. | .............. | 382/232 |
| 2004/0175059 A1 * | 9/2004 | Willner et al. | ................ | 382/305 |
| 2004/0205199 A1 | 10/2004 | Gormish | | |
| 2007/0147686 A1 * | 6/2007 | Joshi | .............................. | 382/232 |
| 2009/0021767 A1 * | 1/2009 | Fujimaki | ...................... | 358/1.15 |

FOREIGN PATENT DOCUMENTS

| | | |
|---|---|---|
| EP | 1496667 | 1/2005 |
| JP | 2005-033801 A | 2/2005 |

OTHER PUBLICATIONS

Taubman et al., "Architecture, Philosophy, and Performance of JPIP: Internet Protocol Standard for JPEG2000", Jul. 2003, International Symposium on Visual Communications and Image Processing (VCIP2003), SPIE vol. 5150, pp. 649-663.*
Buckley et al., JPEG 2000 Part 6 FCD 15444-6, Nov. 16, 2001.*
J. Houchin et al., "File Format Technology in JPEG 2000 enables flexible use of still and Motion Sequences", Signal Processing: Image Communication, Jan. 2002, 14 pages, XP004326803.
Search Report, European Patent Office, Application No. EP 07 10 3113, Jul. 18, 2007, 7 pages.
JP Office Action for JP App No. 2007-049884, dated Sep. 3, 2011, 4 pages.

* cited by examiner

Primary Examiner — Stephen Hong
Assistant Examiner — Mario M Velez-Lopez
(74) Attorney, Agent, or Firm — Blakely, Sokoloff, Taylor & Zafman LLP

(57) ABSTRACT

A method, apparatus and article of manufacture for network access of partial document imagery is described. In one embodiment, the method comprises receiving a request for a region of a page of a document, the request being originated from a client, determining one or more objects in a source file that intersect the region of the page, the source file having two or more codestreams, and sending a response having a subset of the information in the file.

18 Claims, 9 Drawing Sheets

| Metadata-bin #0 | JPM Box Size |
|---|---|
| jP | 12 |
| ftyp | 20 |
| mhdr | 29 |
| page | 491 |
| page | 781 |
| pcol | 50 |
| phld | 48 |
| phld | 48 |
| phld | 48 |
| phld | 48 |
| phld | 48 |

| Pseudo JPM File | JPM Box Size |
|---|---|
| jP | 12 |
| ftyp | 20 |
| mhdr | 29 |
| page | 491 |
| page | 781 |
| pcol | 50 |
| jp2c | 8804 |
| 0 filled jp2c | 5819 |
| jp2c | 223 |
| 0 filled jp2c | 261 |
| 0 filled jp2c | 281 |

STANDARDIZED NETWORK ACCESS TO PARTIAL DOCUMENT IMAGERY

FIELD OF THE INVENTION

The present invention relates to the field of processing image data; more particularly, the present invention relates to accessing portions of image files via network access.

BACKGROUND OF THE INVENTION

JPEG 2000 is a well-known compression standard. There are a number of parts to the Standard and each part has multiple Annexes.

JPEG 2000 Part 6, officially known as ISO/IEC 15444-6: 2003, *Information technology—JPEG* 2000 *image coding system—Part* 6: *Compound image file format*, is referred to herein as the JPM standard. This standard describes the contents and use of JPM files. Annex E of the JPM standard is titled "Guidelines for Construction URLs for JPM Files.". The JPM standard and fileformat is designed for the storage of document images and allows compression via JPEG 2000 and other methods, in particular G4, JBIG2, and JBIG which are better suited for compression of binary images including text, than JPEG 2000.

The JPM standard lists information that might be useful to access in a JPM file, but only defines syntax by example. More particularly, the return type for a request such as "page=43" is undefined. It could refer to a rendered page in JPEG 2000 format, a JPM file that has been parsed to include only page 43, or the boxes associated with page 43 in the JPM file without any JPM file level boxes.

JPEG 2000 Part 6 Annex E lists examples of request URLs. The examples of request URLs in the JPM standard Annex E include the following items (defined in a form of BNF, where UINT is an unsigned integer and TOKEN is a string with some restrictions):

```
page=UINT / "thumb"
obj=UINT
type= "meta" / "img" / "thumb"
index=UINT
mtype= "text" / "xml"
label=string
coll= "main" / TOKEN
offset=UINT
len=UINT
```

The JPEG 2000 Part 9, officially ITU-T Recommendation T.808|ISO/IEC 15444-9:2004, *Information technology—JPEG* 2000 *image coding system—Part* 9: *Interactivity tools, APIs and protocols*, (*JPIP*), commonly and herein referred to as the JPIP standard, is a definition of syntax and a protocol for the delivery of JPEG 2000 images interactively over a network. JPIP Section C.4.7 Codestream Context is designed to be a mechanism to access one or more codestreams using high-level terms appropriate for a particular file type. The section includes syntax for accessing different composition layers of a JPX file, which are defined in JPEG 2000 Part 2, along with instructions to modify the view window depending on some composition instructions. A use of this syntax with JPIP might look like, "context=jpxl<0-4:2>[s5i2]" which would request compositing layers 0, 2, and 4 and remap frame size and image region using the 3rd instruction of the sixth instruction set box. The same section in JPIP also explains how to get codestreams associated with different tracks from a MJ2 file, which is defined in JPEG 2000 Part 3 and JPEG 2000 Part 12.

There are other document delivery techniques that exist. For example, linearized PDF is a technique to deliver document images in the PDF format. This technique depends on writing the PDF in a special format with index information stored at the beginning of the file. The interaction is completely controlled by the client. An example is described in Rowe, Edward R., Priyadarshan, Eswar; Taft, Edward A.; McQuarrie, "Method and Apparatus for Reading multi-page electronic documents," published 1998, Adobe Systems.

NEC has a software product called Document Skipper which is server software for providing interactive access to document images. Document Skipper receives images from a Canon Multifunction device with MEAP in JPEG format, but converts the images to JPEG 2000 in order to provide multi-resolution and spatial access.

SUMMARY OF THE INVENTION

A method, apparatus and article of manufacture for network access of partial document imagery is described. In one embodiment, the method comprises receiving a request for a region of a page of a document, the request being originated from a client, determining one or more objects in a source file that intersect the region of the page, the source file having two or more codestreams, and sending a response having a subset of the information in the file.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
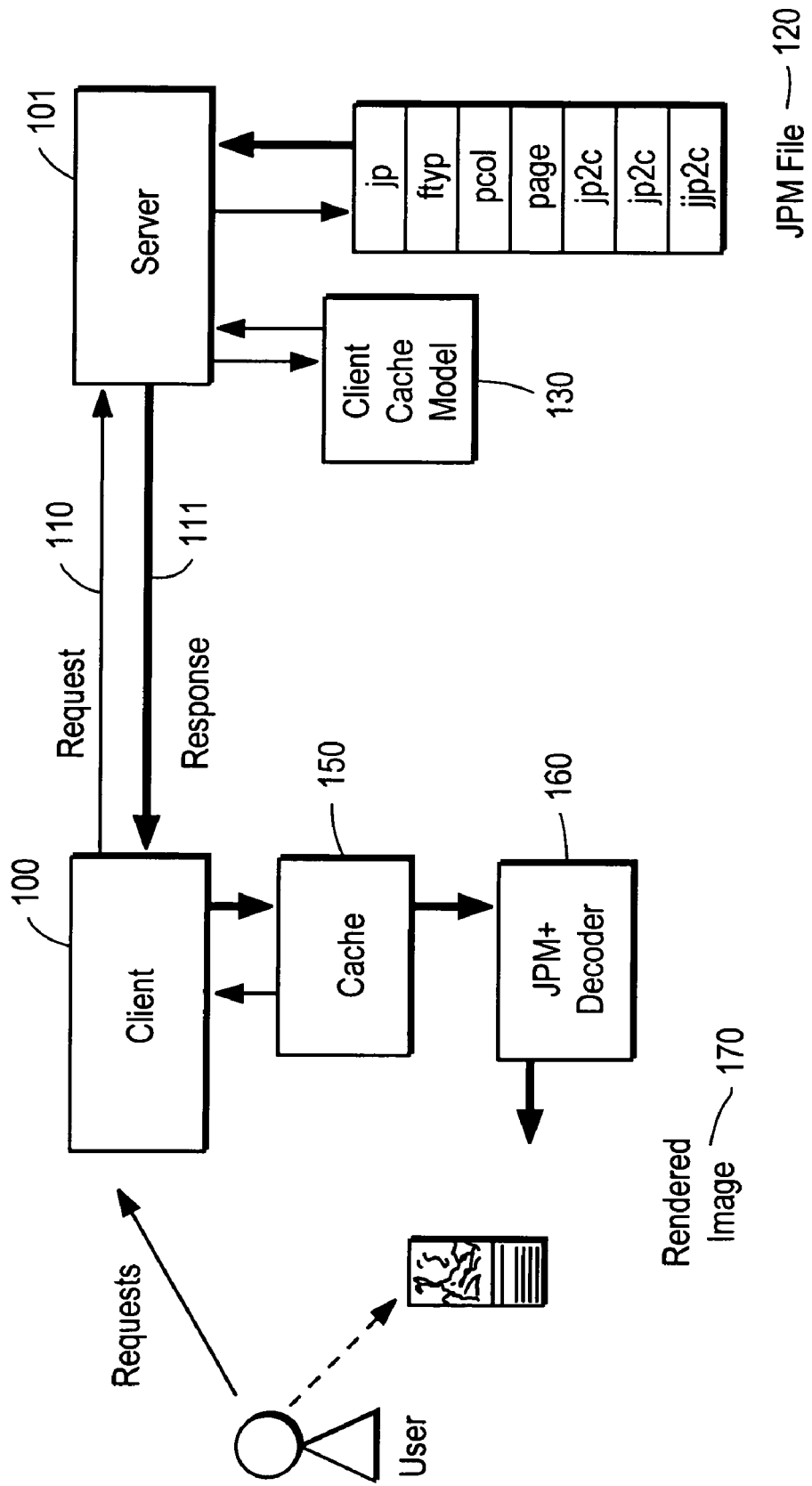
FIG. 1 is a block diagram of one embodiment of a client-server network.

A method and apparatus for delivering document imagery over a network are described. In one embodiment, the techniques described herein provide for interactive capabilities of JPIP for document imagery stored in JPM files. An example of syntax to support the delivery is disclosed as well as the methods used by the client and the server to handle the document imagery delivery.

Specific server implementation techniques, specific client implementation techniques, and joint PDF/JPM interactions are described as well. These include implementation specific details of JPIP-JPM (e.g., place holder box usage, preference marker usage, mechanism for URLs in cache files, and client controlled JPIP-JPM) and PDF/JPM interactions (e.g., serving PDF files containing JPEG 2000 and other compressed streams with JPIP-JPM, serving PDF files containing JPM files, JPM files containing fully valid PDF file, serving JPM files containing PDF as either JPM or full PDF file, and serving JPM or PDF with extremely small additional space). Additionally, techniques described herein use the JPIP standard with the PDF file format. Techniques for efficiently storing both PDF and JPM version of a document without repeating the codestreams are also described.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

JPIP Access to JPM Files

JPIP may be used to serve JPM files. Techniques are disclosed for communicating portions of a JPM (document image) file over a network using a syntax for communication of requests and responses built on JPIP. In so doing, access to regions of pages and specific objects may be performed. Metadata bins defined in JPIP are used to return whole or partial codestreams for objects needed to render a desired window. JPM software provides incremental decoding of a JPM file and provides the indexing information needed by a JPIP server providing access to JPM files. An example of a client and an example of a server, both involved in the process of accessing JPM files are also described.

FIG. 1 is a block diagram of one embodiment of a client and server connected by a network. Referring to FIG. 1, the network connects a client 100 and a sever 101. Client 100 makes a request 110 for a region of a page of a JPM file. The request may occur in response to the user using a user interface. For example, client 100 may scroll left, scroll right, scroll up, scroll down, zoom in, and/or zoom out on the screen. Additionally, the user could invoke page forward, page backward and go to page options using buttons or other user interface elements on a user interface. The request may include a page number.

Server 101 receives request 110 and, in response thereto, determines which layout objects in JPM file 120 intersect the requested region. Server 101 sends back a summary of the file. Even though this file summary may include data essential to decoding the file, the JPIP standard refers to it as a metadata bin, because it is not compressed sample data from pixels. In one embodiment, the metadata is sent in a metadata bin (e.g., "metadata bin 0"). The summary contains some boxes copied directly from JPM file 120, and placeholder boxes that replace many of the boxes (especially the larger boxes containing codestreams typically these boxes are the Media Data box (mdat) or a Continguous Codestream box). In addition to "metadata bin 0," server 101 sends back parts of other boxes (e.g., codestreams) necessary for client 100 to render the desired region. Server 101 keeps track of the information sent to client 100 using client cache model 130 so that information need not be resent when client 100 makes additional requests for portions of the JPM file.

Client 100 receives response 111 to request 110 and stores it in cache 150. Using a JPM decoder 160, client 100 decompresses the codestreams from cache 150 necessary to display the region, composites the codestreams and any constant color objects from the file, and displays the rendered image 170.

Based on user input (or proactively), client 100 may subsequently make a new request (not shown) for a different region, or a different scale, or a different page of the JPM file. Server 101 examines the new request, possibly interrupts the current response, selects the data appropriate for the new response, and sends the data that is appropriate for the new response that has not been previously sent.

Overview of Metadata Bins and Placeholder Boxes
Databins

Data returned by a JPIP server is sent as messages. These messages are a collection of bytes from a particular databin. In one embodiment, each message contains a header that identifies the type of databin from which the content of the message comes and the number of the databin of that type, referred to herein as the "in class id." In one embodiment, there are four types of databins: metadata, main header, tile, and precinct. Metadata and main header data bins are used by both tile-based (JPT-stream) and precinct-based (JPP-stream) JPIP servers. Tile databins contain portions of the JPEG 2000 codestream for JPT-stream sessions. Precinct databins contain portions of the JPEG 2000 codestream for JPP-stream sessions. The file format information, which is all of the non-codestream data in the file, is provided by metadata-bins. Server 101 can decide how to divide a file into metadata-bins subject only to a few restrictions. The restrictions are described in Section A.3 of the JPIP standard.

In one embodiment, each box at the file level is either in metadata-bin 0, or there is a place holder box for the box in metadata bin 0. The placeholder box, described below, indicates the metadata bin for any boxes that are not included in metadata-bin 0.

Placeholder Boxes

The placeholder box is defined in Section A.3.6.3 of the JPIP standard. The placeholder box takes the place of a box from the original file when it is sent over a network and stored on the client. Because it is a box, the placeholder box starts with a length, and type, the type is 'plhd'. The placeholder box also contains the original box length and type. Thus, client 100 receiving a placeholder box knows the type of information that has been replaced. The placeholder box also contains a metadata bin number for the contents of the original box. That metadata bin may not be available to client 100. In fact, in many cases, client 101 does not obtain the contents of the original box, thus saving bandwidth. Typically, server 101 sends the contents of the metadata bin if it is relevant to the request.

In one embodiment, the placeholder box contains additional information. One optional piece of information is the codestream ID number. This number is used by JPIP to communicate codestream data using JPT-streams or JPP-streams (and hence tile data bins or precinct data bins) instead of using metadata bins.

JPIP/JPM Protocol Elements for Request and Response
Request Elements

In one embodiment, a typical request for a region of a page looks like:
GET/two_page.jpm?fsiz=370,218&rsiz=370, 218&cid=16807&context=jpmp<2> HTTP/1.1 Host: www.example.com Note that the above two line format is used by the http and JPIP protocols; however, it is more common to express requests as a single line universal resource locator URL, and this will be done for the rest of this application. Browsers automatically translate the one line URL from a user input or an html link into the multiline request used for transmission over the channel. The above request would have an equivalent URL of:
http://www.example.com/two_page.jpm?fsiz=370, 218&rsiz=3770,218&cid=16807&context=jpmp<2>

All of the elements of this request are the same as normal JPIP except for "context=jpmp<2>" which is used to indicate the desired page number. The "context=" request field is defined in the JPIP standard and usage of this field is defined to support JPX and MJ2. Amendment 1 to the JPIP standard extends the use of the context field for JPM files.

In addition to the page number, the ability to request specific layout objects and mask or image regions is supported. In one embodiment, this is accomplished using information specified in the request. One embodiment of the request syntax is given in BNF by:

```
jpm-context = "jpmp" "<" jpm-pages ">" [ jpm-objects ]
jpm-pages = [ jpm-page-collection ":" ] jpm-sampled-range
jpm-objects = "[" jpm-object-range "]"
jpm-page-collection = object-id
jpm-sampled-range = page-object-range [ ":" sampling-factor ]
page-object-range = 1#(object-id [ "-" [ object-id ] ])
jpm-object-range = UINT-RANGE ":" jpm-object-type / UINT-RANGE / ":" jpm-object-type
jpm-object-type = "mask" / "image" / "nostrm"
object-id = UINT / DQUOTE TOKEN DQUOTE
DQUOTE = %x22
```

In this syntax, an example of a request for mask objects is:
context=jpmp<0>[1-3:mask]

In this case, the server is requested to return all data corresponding to mask objects in the first three layout objects on the first page, which is numbered "0" in the above syntax. This request includes all boxes necessary to render the desired region, e.g. Page Boxes, Layout Object Boxes, as well as any codestreams referenced by those objects.

Thus, a request without a view window could look like:
jpip://www.example.com/file.jpm?context=jpmp<"figures": 2-3>[1-:mask]

which would request all mask objects, on pages 2 and 3 of the "figures" page collection.

A more typical, and simple, request might be just page 2 from the main page collection:
http://www.example.com/file.jpm?context=jpmp<2>

The simplest usage of the amendment to JPIP allows a request to be made for all the items needed to render a single page. More complex usage allows only some of the layout objects or only one type of object to be requested. In one embodiment, the jpm-context contains a request for specific pages; it may also contain a specification for page collections, a list of layout objects, and objects types.

If no page collection is provided, then the main page collection from the JPM file is assumed. If a string is specified, it corresponds to a label of a page collection box in the target JPM file.

A range of pages is a required part of the jpm-context. The page range could be "0-" which would specify all the pages in the page collection. In one embodiment, pages are numbered by doing a depth first search of the page collections and pages in the JPM file, and assigning the number 0 to the first page reached, 1 to the next, and so on.

If the jpm-context has no jpm-object-range item then it is considered to be "1-" which corresponds to all objects on the page except the thumbnail. The jpm-object-range indicates which of the layout objects on all pages in the jpm-page-range are requested.

If the jpm-context has no jpm-objects, then mask and images are requested in addition to the other boxes necessary to understand the positioning and compositing of the masks and images. If the jpm-object-type is "mask," then only mask objects are of interest for the request. If the jpm-object type is "image," only image objects are of interest. If the jpm-object-type is "nostrn" then only boxes not containing codestreams are of interest.

If the jpm-context parameter appears in a request without a Frame Size request (fsiz), then the Frame Size values fx and fy are set to the page width and page height. If the jpm-context parameter appears in a request without a Region Size request (rsiz), then the Region Size values rx and ry are set to the frame size values fx and fy (after fx and fy have been set to the page width and height if necessary).

Determination of Requested Codestreams

When the jpm-context parameter is used, the request corresponds to the view window applied to each page independently. The Frame Size values fx and fy are mapped to the page width and height as specified by the Pwidth and Pheight elements of the Page Header Box of the JPM standard.

In one embodiment, a layout object within a page is considered part of the request if and only if all of the following are true:

$$ox' \leq LHoff + LWidth$$

$$ox' + sx' \geq LHoff$$

$$oy' \leq LVoff + LHeight$$

$$oy' + sy' \geq Lvoff$$

where:

$$ox' = ox * Pwidth / fx$$

$$oy' = oy * Pheight / fy$$

$$sx' = sx * Pwidth / fx$$

$$sy' = sy * Pheight / fy$$

and fx, fy, ox, oy, sx, and sy are given by the view window requests, and LHoff, LVoff, LHeight, and LWidth are from the Layout Object Header Box of the JPM standard.

In one embodiment, layout object 0 is reserved for a thumbnail image of the page, it should be considered part of the request regardless of the view-window if and only if 0 is included in jpm-object-range.

Determination of Codestream View-Window Parameters

The client is considered to have requested any codestream associated with the mask or image that intersects the view-window. In other words, in such a case, the server considers those objects as being requested by the client. If the codestream is not compressed with JPEG 2000, then the request is for the complete codestream. If the codestream is compressed with JPEG 2000, then an equivalent view-window can be determined for the specific codestream by mapping the request window on the page to the request window on the object as follows:

$$fx' = fx * Lwidth / Pwidth$$

$$fy' = fy * Lheight / Pheight$$

$$ox' = MAX(ox - LHoff * fx / Pwidth, 0)$$

$$oy' = MAX(oy - LVoff * fy / Pheight, 0)$$

$$sx' = MIN(ox + sx - LHoff * fx / Pwidth, Lwidth * fx / Pwidth) - ox'$$

$$sy' = MIN(oy + sy - LVoff * fy / Pheght, Lheight * fy / Pheight) - oy'$$

Thus, the server maps one request on a JPM file to one or more requests on JPEG 2000 codestreams. In one embodiment, the request on the JPEG 2000 codestream has JPIP syntax like:
File.jp2?fsiz=fx',fy'&roff=ox',oy'&rsiz=sx',xy'
where the primed values, e.g. ox' are replaced with an integer ascii representation.

Note that it may be necessary to issue a frame-size request with values larger the width and height of the page in order to obtain a full resolution JPEG 2000 codestream if the JPEG 2000 file contains data at a higher resolution than the page. Alternatively, the client could determine the codestream number and issue a request directly on that codestream with a view-window chosen appropriately.

Response Elements

In one embodiment, the server responds with metadata bins as defined in Section A.3.6 of the JPIP standard. The top level of the file appears in metadata bin 0. Some of the boxes, in particular large boxes containing codestreams are replaced with placeholder boxes. For codestreams other than JPEG 2000, if the codestream is needed for the request, the whole codestream is sent. Required JPEG 2000 codestreams can either be sent by simply copying from the file just as with the other codestreams, or by using data-bins for JPP-streams or JPT-streams (the placeholder box indicates the codestream number for each codestream provided in this way).

Note that the JPM server includes a "http" header line if it modifies the context request (typically by reducing it to a smaller size). The JPM server also uses this header line to indicate the codestream numbers associated with the context-range.

JPM Server Operation

In one embodiment, in order for a JPM file to be served by the JPM server, an auxiliary layout object information file is created and stored in the same directory as the JPM file. This is called a "JPM info file" in the following paragraphs. This file contains a list of all the layout objects in the JPM file. For each object, the page number, the x-offset, the y-offset, and the height and width are stored and used to determine if the object intersects with a request. The page size is also included in the JPM info file. In addition, the offset in the JPM file of the codestream for each layout object is stored.

Figure 2:
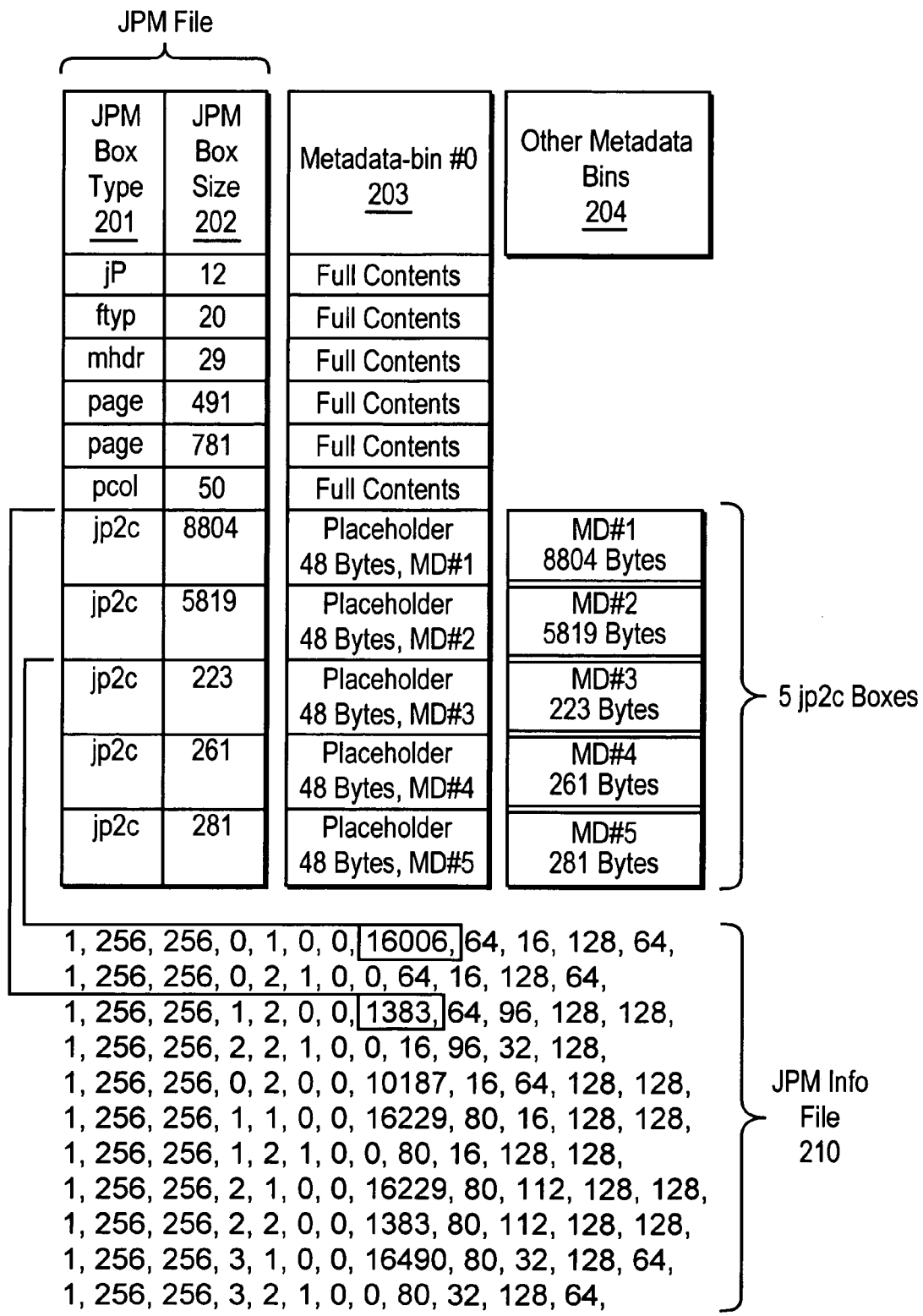
FIG. 2 illustrates the contents of a JPM file and the representation on a server and a client.

FIG. 2 illustrates a JPM file and a JPM Info file and the JPM server contents for a particular JPM file. Referring to FIG. 2, the representation used by the server for the JPM file includes JPM Box types 201, JPM Box size 202, Metadata-bin 0 203, and optionally other metadata bins e.g. 204 for each different box. An example of the information file 210 for the sample JPM file is shown in the lower part of FIG. 2. The fields of this example file are: page number (with page numbers starting from 1 not 0 in this example), page width, page height, layout object number, object type (mask, image, or combined mask image), no codestream, data reference number, offset of codestream in the file, LHoff, LVoff, LWidth, and LHeight.

The server makes use of the list of objects in the file to find which objects in the JPM file intersect with the region specified in the client request. In one embodiment, the server uses a function that scales the view to the size of the page and returns a 1 if the requested scaled region intersects the object in anyway. This determination requires the page size, the object position, and the extent of the object from the object list file.

The server next makes use of the list of objects to determine the boxes of the JPM file that must be sent to enable the client to render the specified region. In one embodiment, the server performs this operation by making use of the data reference number for the object, and the offset into the file. In one embodiment, the JPM server only returns codestreams within the same file as the request is made on (i.e., only those with a data reference number of zero) and the client issues a separate request to receive data from outside the JPM file.

For a request on a JPM file, the server scans the requested file, and produces a list of all the boxes and their positions for internal use. Any contiguous codestream has a placeholder box created for it. See Section A.3.6 of the JPIP standard for details of metadata-bins and placeholder boxes.

The JPM server returns metadata-bin 0 with the first request on any file. This stream of bytes contains either the full box, or a placeholder box for every top level box in the file. In one embodiment, the JPM server only replaces continuous codestream boxes with placeholder boxes. In another embodiment, other boxes are replaced with metadata bins. For example, all boxes larger than a threshold size might be replaced by metadata bins. This can occur when a large amount of metadata is stored in the JPM file.

FIG. 2 also shows a JPM file on the upper left with each top-level box listed, along with the size of the box. To the right of the JPM file, the contents of metadata-bin 0 are shown. In one embodiment, the JPM server does not create metadata bin 0 completely on disk or in memory. The boxes that are part of metadata-bin 0 are copied from the original JPM file when they are sent as part of the response. The placeholder boxes are created in memory for each codestream and are sent as part of the response.

the layout object. If a server splits page boxes into multiple databins, the JPM info file could be used to determine which of those metadata bins should be sent as well.

In one embodiment, the JPM server sends objects in order based on amount of image improvement. As described above, the JPM server determines all objects that intersect the requested view and returns these objects in the order they appear in the file. The amount of overlap is computed, and the objects are returned in the order of greatest overlap with the requested image.

In one embodiment, the JPM server provides JPEG 2000 codestreams outside of metadata bins. Since the client and server both support transmission of partial JPEG 2000 codestreams, these codestreams are sent in tile data bins or precinct data bins rather than in metadata bins.

JPM Client Operation

The JPM client manages a user interface. In one embodiment, the interface includes buttons to allow access to the previous page and next page for a multi-page JPM file. Buttons for pan and zoom operations and other user interface elements may also be included.

When requesting a page other than the first page, the client adds "context=jpmp<n>" to the query string. The client stores all received metadata bins in the cache directory with the name of the original file, +".cachej2c" +"mc"+class of the metadata bin+".bin"+the in-class id number of the metadata bin. Annex A of the JPIP standard specifies all of the data bin classes. Metadata bins are class 8, and the JPM server numbers the bins in the order the contiguous codestreams appear in the file. Thus, after receiving all the data for the first page of "two_pagejpm," the JPM client has a cache with the following files:

```
-rw-r--r--   1 gormish   wheel   1623 21 Feb 10:37 two_page.jpm.cache.j2c.mc8.bin0
-rw-r--r--   1 gormish   wheel   8804 21 Feb 10:37 two_page.jpm.cache.j2c.mc8.bin1
-rw-r--r--   1 gormish   wheel    223 21 Feb 10:37 two_page.jpm.cache.j2c.mc8.bin3
```

The contents of the JPM info file for a JPM file are also shown in FIG. 2. The largest numbers in this case are offsets of the objects into the original JPM file. In order to send page 1, the JPM server finds all objects on page one and, for each object, determines which codestreams are needed. Because codestreams were excluded from metadata-bin 0, the JPM server sends the appropriate metadata bin for each needed codestream. In the example of FIG. 2, metadata-bins 1 and 3 are required.

In one embodiment, the JPM server automatically generates the JPM info file when a request is received for a JPM file that doesn't have a JPM info file available on the server. Alternatively, the JPM info file could be generated when a JPM file is added to the server. Alternatively, the server would not need to save a JPM info file at all, and the information could be integrated with the server code for serving JPM files. In such a case, the server determines the object list when each file is opened. Having the info file already available is sometimes faster than parsing a large JPM file.

Figure 3:
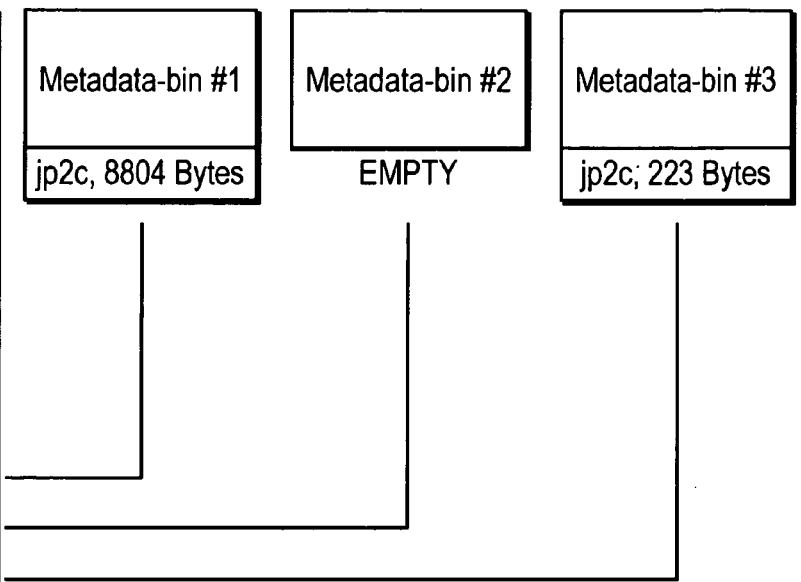
FIG. 3 illustrates the contents of one embodiment of a JPM document.

In one embodiment, since the JPM server keeps track of the bytes ranges of all metadata bins sent, even if different layout objects make use of the same codestream, the data will only be sent once. This is the case in FIG. 2 where the codestreams at offsets 16229 and 1383 are used multiple times. Some layout objects have no codestreams (as for the 6th entry in the JPM info file). The JPM server takes no action for these layout objects, and everything needed from them is provided within This is shown pictorially in FIG. 3. Because metadata-bin 0 contains valid JPM boxes, the beginning of the file is a JPM file; however, because the JPM server replaced some of the boxes with placeholder boxes, the file offset in the JPM page boxes, and other file offsets do not point to the correct locations in the file. Because place holder boxes are smaller than the replaced box, the offsets will likely point outside of the metadata bin and won't point to the correct location. Not all the metadata-bins pointed to by the placeholder boxes will be available at the client.

In one embodiment, because the boxes in metadata-bin 0 have incorrect offsets, the JPM client creates a new pseudo JPM file. To create this file, regular boxes from metadata-bin 0 are copied as is, while placeholder boxes are replaced with the content of the appropriate metadata bin received from the JPM server. When a metadata bin is not available or has been only partially received, the client fills the pseudo JPM file with 0 bytes (or some other value) of the required length. Note the correct type and length of the box are known from the placeholder in metadata bin 0. This pseudo JPM file now has correct offsets for the boxes that are present, but it is not a "legal" JPM file because some jp2c boxes do not contain legal codestreams.

Provided that the JPM server correctly sends all codestreams required for the requested view window, the client is able to decode all the bits that apply to the requested region of the page, and display the same information as if the full file was available at the JPM client.

As described above, in one embodiment, all data except contiguous codestreams is returned with the first request. If metadata becomes very large, the metadata is not returned except when requested.

In one embodiment, the JPM decoder handles missing data and possibly reads placeholder boxes directly. In this case, it would not be necessary to form a large "pseudo JPM" file for decoding. The server can still deliver items in the same order and set of metadata bins but the JPM decoder must compute the location of offsets in the original file and convert to positions in the metadata bins.

In one embodiment, the JPM client deals with missing data by rewriting the JPM file using external references for metadata bins, whether they have been received or not. Data bins that have been received can be decoded. This would require writing a file that was different from metadata bin 0, but that file would be substantially smaller than a zero filled file. Use of external references allows the decoder to check the timestamps on the external files to decide if the codestreams have been updated and should be decoded again.

In one embodiment, the JPM client and JPM server support requests in addition to the page number. For example, these requests could be for page collections, pages numbers, layout objects, and masks and images.

In one embodiment, the JPM client and server support fragment tables. If a fragment table is used, and the fragment table specifies internal offsets, e.g. in 'mdat' boxes, the JPIP server serves only portions of the metadata bin for the 'mdat' box which contains the codestream, and the client is able to decode when receiving only these pieces.

JPM Decoder and Use

In one embodiment, the JPM client stores received metadata bins in separate files, which is sufficiently efficient and allows deletion of unnecessary data. However, if the JPM decoder cannot understand the placeholder boxes used by JPIP, a copy of all the received data is made every time it is decoded, in addition zero bytes are stored in the pseudo file for unreceived data. The client thus might use twice the original file size as stored on the server.

In one embodiment, the JPM decoder is integrated with the JPIP client. In such a case, it reads placeholder boxes and use that information to correct the offsets in all locations in the JPM file.

In one embodiment where a JPM decoder is used which is independent of JPIP, any new information for any metadata bin causes all required codestreams to be decoded again. This is unavoidable because the JPM decoder is given a completely new file and doesn't know which parts are new and which are old. In one embodiment, the JPM decoder uses placeholder boxes and metadata bins directly and, thus, detects which metadata bins had new information, and thus which codestreams needed to be decoded again and composited.

Document Skeletons

In one embodiment, the amount of material being transferred across relatively slow electronic links is regularized using a skeleton file, which can be treated like a document but contains pointers instead of codestreams. This skeleton file may be a JPM file.

The JPM format includes the notion of codestream fragments. A codestream is the compressed image data for some portion of the page. A fragment is a contiguous section of the codestream, which is found at a certain byte range within a file. Codestream fragments needed to render a page can be stored in the same file as the headers or in another file possibly available only across some network. The necessary codestream fragments are identified by referring to an entry in a table of references called the Data Reference Box and the offset in the file and length of the fragment are stored in a Fragment Table Box. In one embodiment, this JPM feature is used to create skeleton documents. Such documents are completely valid JPM files, but have only a small subset of the codestreams needed to render the complete pages in the local file. Most or all codestreams in a skeleton file are not included, only a reference is contained in the file. A skeleton file may be created by making a copy of the document structure without any included codestreams. To create a skeleton document from a complete document, processing logic creates a Fragment Table box (ftbl) and Fragment List box (fist) for each codestream in the source document. The process is performed by logic that may comprise hardware (circuitry, dedicated logic, etc.), software (such as is run on a general purpose computer system or a dedicated machine), or a combination of both. In one embodiment, an appropriate block size for codestreams is chosen and a fragment list is produced, which is pre-segmented into blocks. This size might be a fixed number of bytes that would be good for network transportation, or it could be related to the content of the codestream, e.g. corresponding to a tile-part of a JPEG 2000 codestream.

Figure 4:
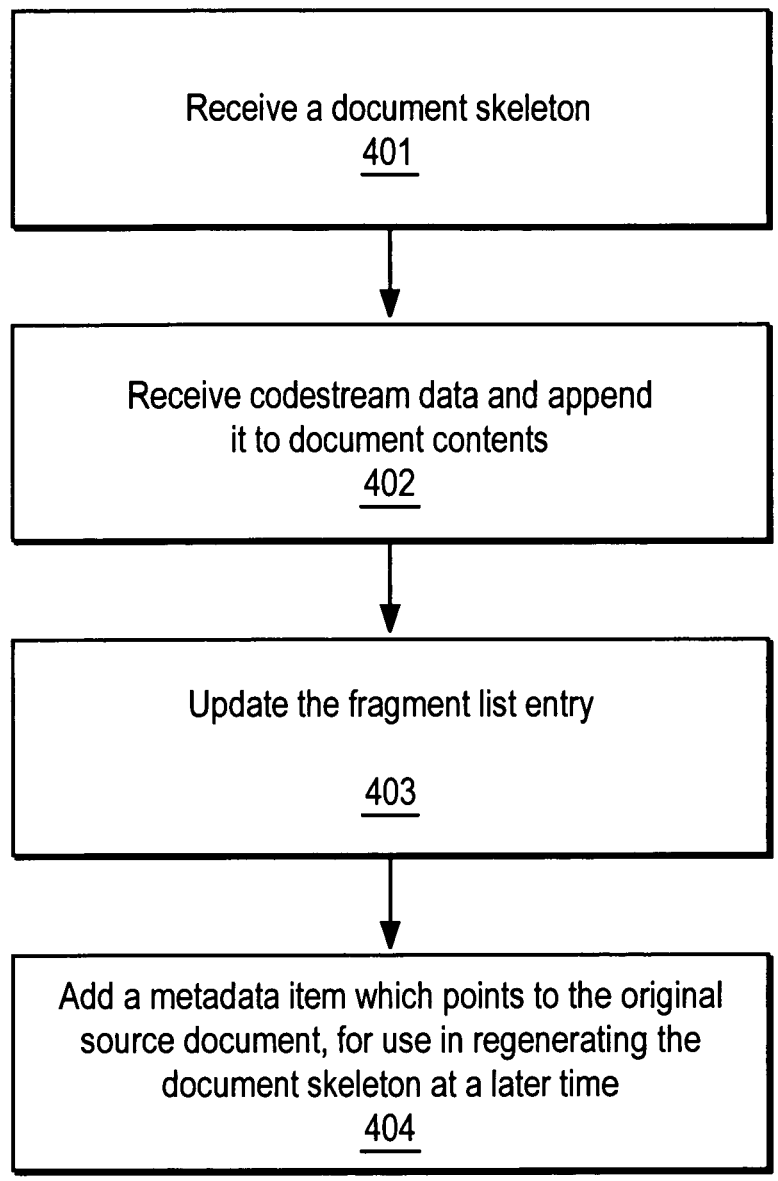
FIG. 4 is a flow diagram of a process for using a skeleton document.
Figure 5:
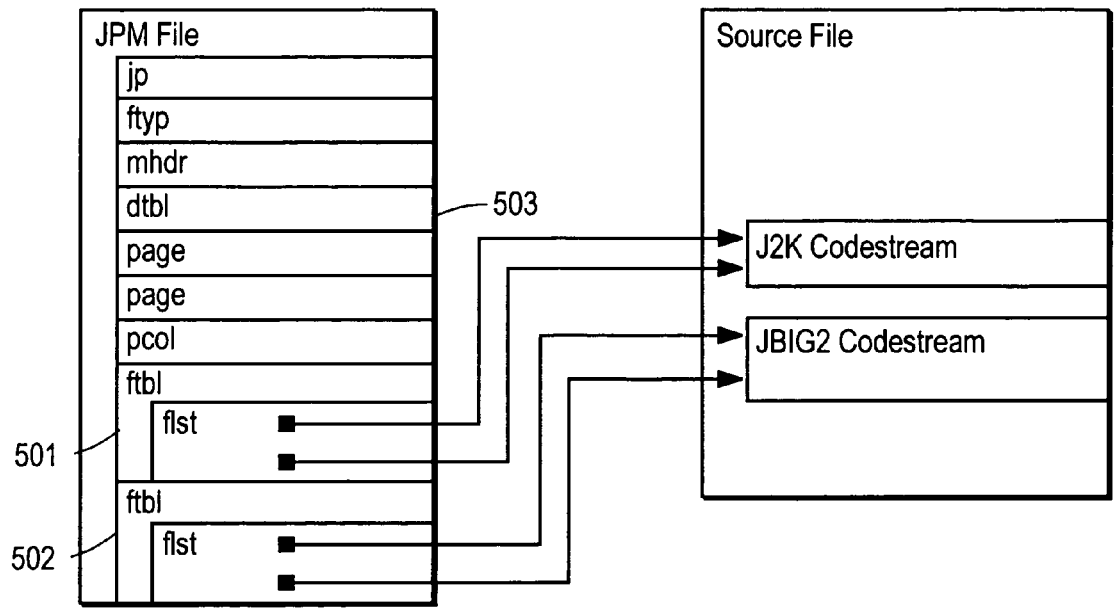
FIG. 5 is an example of a skeleton document as a JPM file.

FIG. 4 is a flow diagram of actions that might be taken by a client or user application with a skeleton document. FIG. 5 is an example of a document skeleton. Referring to FIG. 5, the document skeleton includes two Fragment Table Boxes (ftbl) 501, and 502, each of which contains a single Fragment list box with two entries. Both entries point to codestream data in the source file.

Referring to FIG. 4, the process begins by receiving or obtaining a skeleton document (processing block 401), such as, for example, FIG. 5. When the skeleton document is read, the pointers in the fragment table box can be accessed and a fragment of new codestream data is received. This additional codestream data can be moved into the local file by appending bytes to the end of the file in a media data box (mdat) (processing block 402). Processing logic updates the Fragment list entry (such as seen in block 501) to point to the new location (processing logic 403). In one embodiment, the fragment list entry has the offset changed to the location in the local file, and the Data Reference entry is also changed to indicate the local file. As fragment list entries are fixed in size, the file may be rewritten in place without making a new copy of the existing contents. As codestream fragments are appended to the file in one or more media data boxes, processing logic also writes the original contents of the fragment list entry immediately past the end of the appended data (processing block 404). Processing blocks 402, 403, and 404 can be repeated several times to transfer data into the file in any order. If the operations are repeated for all external fragments in the file, then a file is obtained which contains all the needed codestreams and no access is needed to the source file to render any part. If an application wishes to recover memory or disk space, the original fragment list entry that was stored in the mdat box can be used to remove data from the file, by restoring the original fragment table entry from this location and deleting the local codestream fragments.

Because all of the data is appended to the end of the skeleton document in a media data box and the fragment list entry is fixed size, this can be done without rewriting the beginning part of the file. Importantly, the original skeleton file can be updated many times without having to rewrite any data except the fixed length fragment table list entries. At each point after processing logic (404) completes, a valid file is available locally. Because the lengths do not change, these updates may be processed quickly in limited memory. The common practice of writing a complete new file and deleting the old one is unnecessary.

Figure 6:
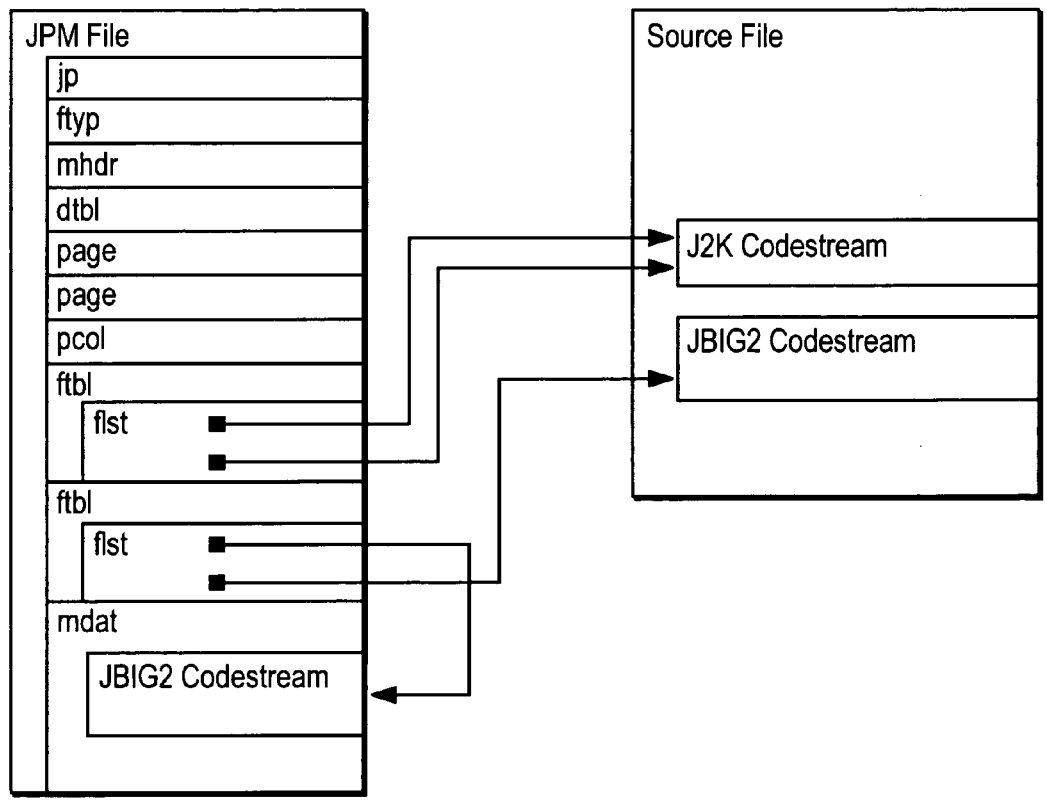
FIG. 6 is an example of a skeleton document with a local codestream fragment.

After enough codestreams are transferred a valid JPM file exists with a readable initial page that mostly points to the local file. In one embodiment, the first page is imaged, allowing the cover sheet to be evaluated, even without network connectivity. An example of the JPM file with some of data stored locally and some still in the source file is shown in FIG. 6.

In one embodiment, the source file in FIG. 5 is a JPM file from which the skeleton file was extracted. In other embodiments, the codestreams could be in individual files or they could be contained in other files, in particular they could be part of PDF, or SVG, SMIL, or FlashPaper files.

It is useful to consider how codestreams can best be fragmented. One approach is to use simple fixed size blocking, which would work well for relatively simple media encodings like JPEG and JBIG. However, JPEG2000 codestreams might produce a specialized fragmentation based on tile size and resolution. Such a fragmentation allows specific pages, page regions, and resolutions to be loaded by choosing appropriate fragments and moving only those codestream fragments associated with the needed regions.

The skeleton documents described herein are advantageous in the following ways. First, they are valid JPM documents. Also, they are much smaller than a complete document, and can be transferred quickly. They can be used as a cache for local copies of the document, with partial codestream contents kept local in case the network is not available. The documents can be appended with new codestream data without a complete rewrite, which may be important on limited capacity storage devices. The codestream fragments can be analyzed for efficient copying of complete pages at specified resolutions. It can easily be determined whether sufficient information is cached locally for displays of a certain resolution, and requests can be made for the minimum set of needed information. A document with many cached codestreams can be quickly pared back to a skeleton, as the skeleton document is streamed out across a communication channel. The document's cached codestream data can be removed and replaced, allowing efficient in-place management of the cache.

Client Caching

When a client receives a partial JPM file, some of the codestreams may be received completely, some of the codestreams may not be received at all, and some of the codestreams may be partially received. In the case of partially received JPEG 2000 codestreams, the received data can be very useful for rendering the file. For example, a client that has received low resolution information for a JPM file, and is rendering the JPM file on a low resolution display device, may not see any change in the final image if the low resolution data is used to create the display image.

If the client needs a higher resolution version of the image, perhaps because the image will be displayed on a higher resolution device, like a printer, or because the user wishes to zoom in on a region of the image, the client issues a new request to server for the data. The client is aware that more data is needed because of its involvement in the JPIP transactions with the server and its access to the message headers received in those transactions. However, at some point the connection between the client and server may be closed and the server may discard the state information from the transactions with the client; in this case, the server will no longer have a client-cache model.

A client could keep all the files associated with the transaction with the server in it's cache, in a manner similar to web clients that keep a cache for several days or until some memory limited is reached. Keeping data allows a user to make use of previously viewed data.

However, the client might also wish to store the received image data in a form that would be useful for "normal" decoders, i.e., decoders which do not have access to the transactional memory of the client, or knowledge of how to deal with special JPIP constructs like metadata bins.

In one embodiment, in order to store JPIP-JPM cache files in a format useful by other applications, and also to allow a client to resume an interaction with a server without storing additional state information, the client uses a special JPM file. This file contains the structure of the JPM file, as expressed in the page collection boxes, page boxes, and layout object boxes. Some or all of the codestreams are stored externally, with the location specified in the Data Reference Box of the JPM file. This is the normal situation for a JPM skeleton file. However, normally, a skeleton file contains either references to local files on the disk or files on the server, or some combination.

To obtain storage and interoperability benefits, the values in the Data Reference Box can contain information about the fraction of the JPEG 2000 file that is stored locally, and the part that is stored on the server by using JPIP cache-model syntax in the reference.

For example, suppose the server example.com provided the JPM file document.jpm that contained or made use of a JPEG 2000 codestream called image1.j2k, and the client had received part of that file via JPIP and stored it in a local file image1_cachej2k. The client could store it's version of document.jpm with a reference in the Data Reference Box of the form:

jpip://example.com/image1.j2k?fsiz=1024,
    1024&rsiz=1024,1024&model=t*r0-2:L4

The portion after the '?' is JPIP syntax; the portion of the JPIP syntax beginning 'model=' indicates that the client has the first 4 quality layers (L4) of resolution levels 0, 1, and 2 (r0-2) for all tiles (t*) in the request window. Thus, when examining this file, a decoder knows that part of the file had already been received, namely the part indicated by the cache-model statement. The decoder would look for the local part of this file in the location where "image1.j2k" from server example.com would be stored (just as it would if a new request was made for the image). The decoder can determine if more of the file is needed by examining the model statement to determine whether the data that is present (this is much quicker than examining the entire file). If the decoder needed more data from the JPEG 2000 codestream (perhaps because it was to be printed), the reference could be used as a request to the server to obtain that data.

This type of reference is especially useful with JPT-streams which are based on tile-parts. In this case the cache file can be a concatenation of the received data from the server, and any additional data from a follow up request could be appended as well. The reference looks identical except the "tpmodel" is used instead of "model". For example, a data reference entry like jpip://example.com/image1.j2k?fsiz=1024,
    1024&rsiz=1024,1024&tpmodel=0.0-5.1 indicates that tile parts 0 and 1 from the first six tiles are present in the cache file. Other cache-model JPIP syntax could be used for similar purposes including "tpneed", and "need".

Another possibility is to use the data reference to indicate files in the cache. Below is an example:

file:/my_browser_cache/image1_cache.j2k?fsiz=1024,
    1024&rsiz=1024,1024&tpmodel=0.0-5.1

In this embodiment, the link to the original server has been lost. However, it could be useful to a decoder that was not planning to make additional requests and did not know the default location for cached files. In another embodiment, a URL is used for a local file, but uses the JPIP target field to specify the location on a server. For example, file:/tmp/cache1.jpm?target=www.example.com/server_dir/
   original_file.jpm&fsiz=1024,1024&rsiz=1024,1024&tp-
   model=0.0-5.1

JPM is especially useful when a file is transferred. For example, when a client device obtains a file and tells the JPM decoder that it is a certain size, the JPM decoder will decode the file. The client device may decide not to perform any network access and only render the file with the information that it has. However, if the client decides to transfer the file that it has to another client, then that client can make network accesses and only request the information that it still doesn't have in the file copy it has.

PDF/JPM Operations

Figure 7:
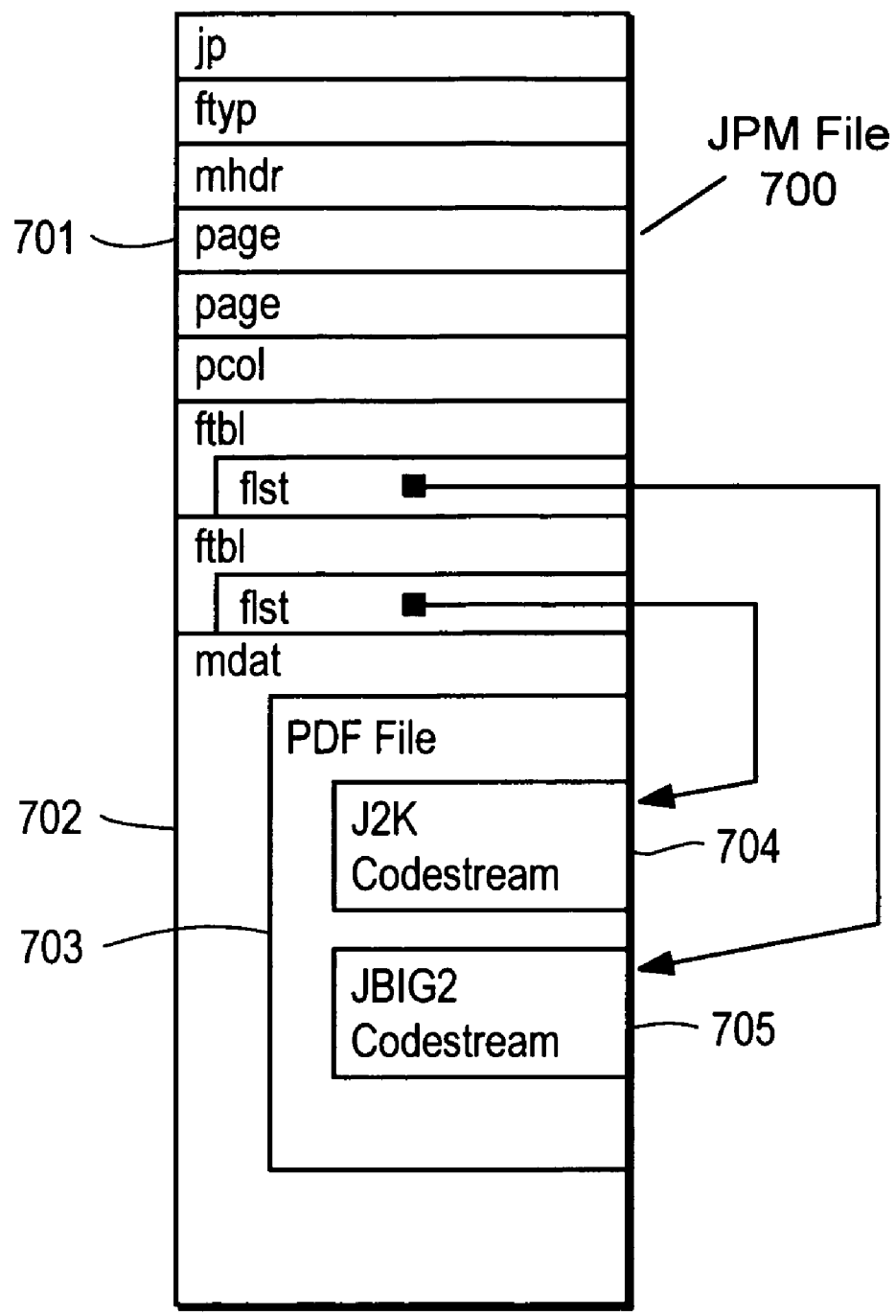
FIG. 7 illustrates an example of a JPM file that contains a PDF file.

In one embodiment, JPM files can contain one or more PDF files. An example of this is shown in FIG. 7. Referring to FIG. 7, a JPM file 700 is shown with the boxes that typically begin a JPM file (Signature box (jP), File Type Box (ftyp), Compound Image Header box (mhdr), Page boxes (page), a Page Collection box (pcol) 701. Rather than a Continguous codestream box (jp2c), this JPM file uses Fragment Table boxes (ftbl) which contain a Fragment list box (fist), which contain offsets to codestreams. A JPM reader will read the file up to the Media Data box (mdat) 702, and use the offsets from the Fragment list boxes to access the codestreams. However, the Media Data box actually contains a complete PDF file 703. This PDF file contains PDF objects which include a JPEG 2000 codestream 704 and a JBIG2 codestream 705. In this arrangement, the PDF file 703 is a legitimate PDF file. That is, if the other portions of the JPM files 700 were removed, PDF file 703 could be read and opened using an a PDF reader such as Adobe Acrobat. However the JPM file itself operates in the same fashion as other JPM files allowing the information and the JPM header and page information 701 to be used to access JPEG 2000 codestream 704 and JBIG codestream 705. There is no duplication of the JPEG 2000 and JBIG codestreams. Note that the particular order of boxes in the JPM file is an example and many others are possible. In particular, the MDAT box could appear closer to the beginning of the file, allowing a server to more quickly skip the JPM portions when accessing the file as a PDF file. To remain a legal JPM file, there are some restrictions on ordering e.g. the File Type box must follow the JPEG 2000 Signature box.

Figure 8:
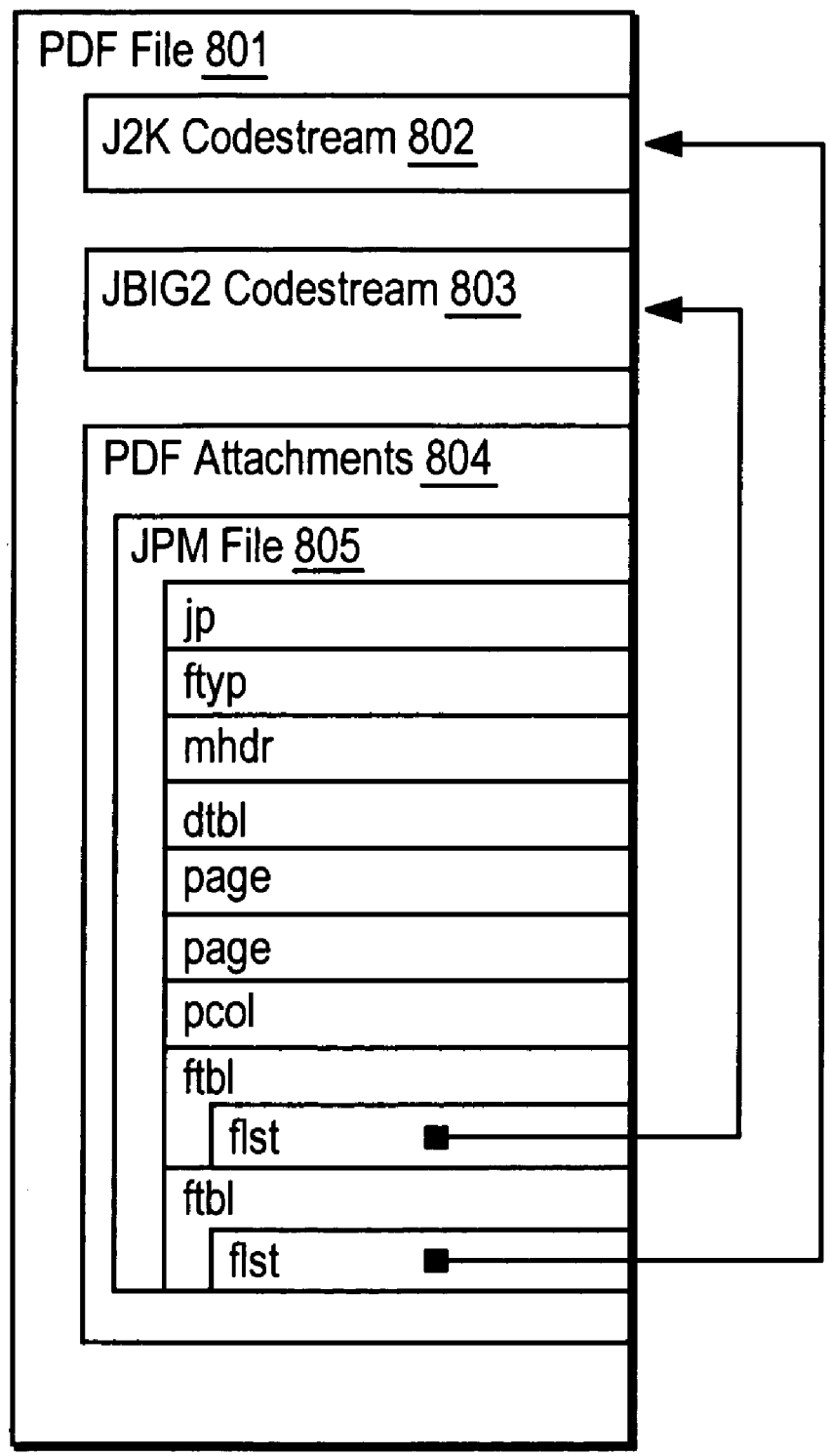
FIG. 8 is an example of a PDF file that contains one or more JPM files.

PDF files may contain one or more JPM files. FIG. 8 illustrates an example of a PDF file containing one JPM file. Referring to FIG. 8, the PDF file 801, includes JPEG 2000 codestream 802, JBIG2 codestream 803, and PDF attachment 804. PDF attachment 804 contains a JPM "skeleton" file which doesn't contain any codestreams. Instead, the JPM file contains a Data Reference box 'dtbl' which provides the name of the PDF file. The JPM file also contains Fragment Table Box with an Fragment List box. The Fragment list box contains offsets within the PDF file of the JPEG 2000 and JBIG2 codestreams. In PDF file 800, the JPM header and page information 805 appear at the end of the PDF file, but items could be stored at various locations depending on the definition of a PDF file. If the JPM file is copied out of the PDF file, but the reference within the Data Reference box still points to the PDF file, the independent JPM file can locate and use the codestreams within the PDF file. Although the JPM file is shown as taking a lot of space in the diagram, the actual file size of the JPM file without codestreams is typically much smaller than the codestreams.

In one embodiment, the server provides access to both formats from one file. Therefore, in response to receiving a request from a device, the server knowing the capabilities of the client device, via information in the request or through prior information exchange with the client, can utilize a single file to provide the necessary information to the client devices to enable the client device to display and/or process the document. For example, if a smart server knows that the client device has Acrobat Reader but is incapable of processing the JPM information, the smart server can access the file, such as JPM file 700, and discard those portions related to the JPM header, thereby leaving the PDF file 703 that can be provided to the client device. Similarly, if the file requested by the client is a PDF file such as PDF file 800, and the smart server knows that the client device requesting the file cannot accommodate PDF files, then the smart server may provide the JPM file information, including JPM header and pager information 805, JPEG 200 codestream 802 and JBIG codestream 803, to the client device.

Figure 9:
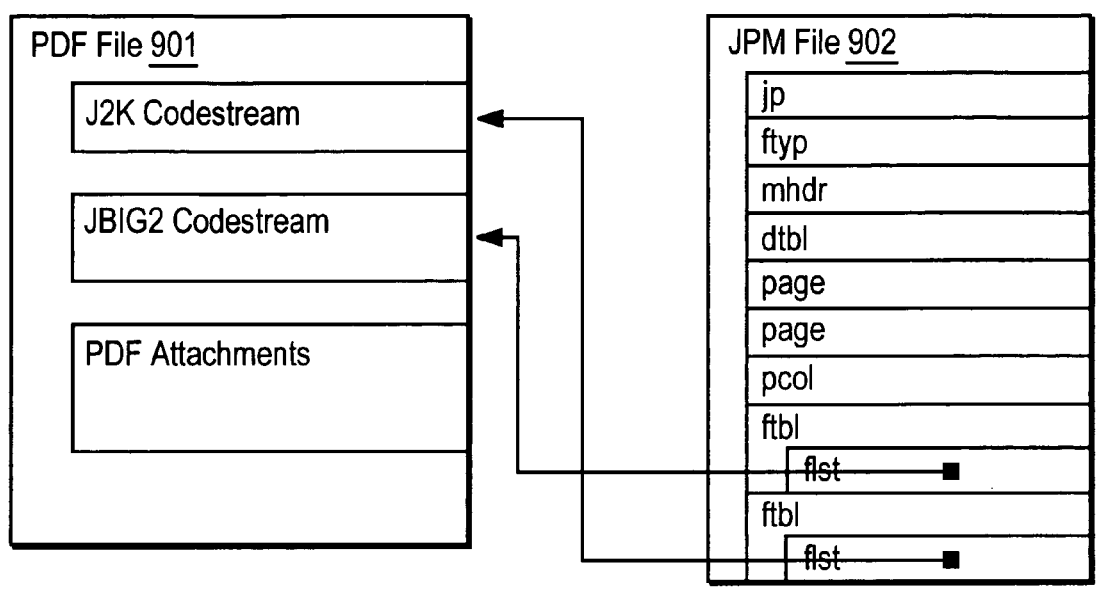
FIG. 9 is an example of a JPM file referencing a PDF file.

FIG. 9 shows a PDF File 901, and a separate JPM file 902. This situation could be used on a server to keep both a PDF file and a JPM file ready to be served, while keeping the codestreams only in the PDF file. This situation could occur when a JPM file is copied out of a PDF file as in FIG. 8. This situation could also occur when the client has received a JPM skeleton file over the network but the PDF file is still on a server.

If the client is capable of receiving JPM files and JPIP databins, then the server may respond to requests for partial document contents. With the use of the JPM file headers and boxes, the server can select pages and codestreams that are needed, package these in metadata bins, tile data bins and precinct databins. The client need not be aware that the format on the server is actually a PDF file, or that the JPM file contains a PDF file.

If the format on the server is a JPM file containing a PDF file, the PDF portion of the file can be delivered to the client as metadata. Then a client could reconstruct a PDF file from the JPM databins received. The file at the client could again play a dual role, being useable by both PDF and JPM readers.

An Exemplary Computer System

Figure 10:
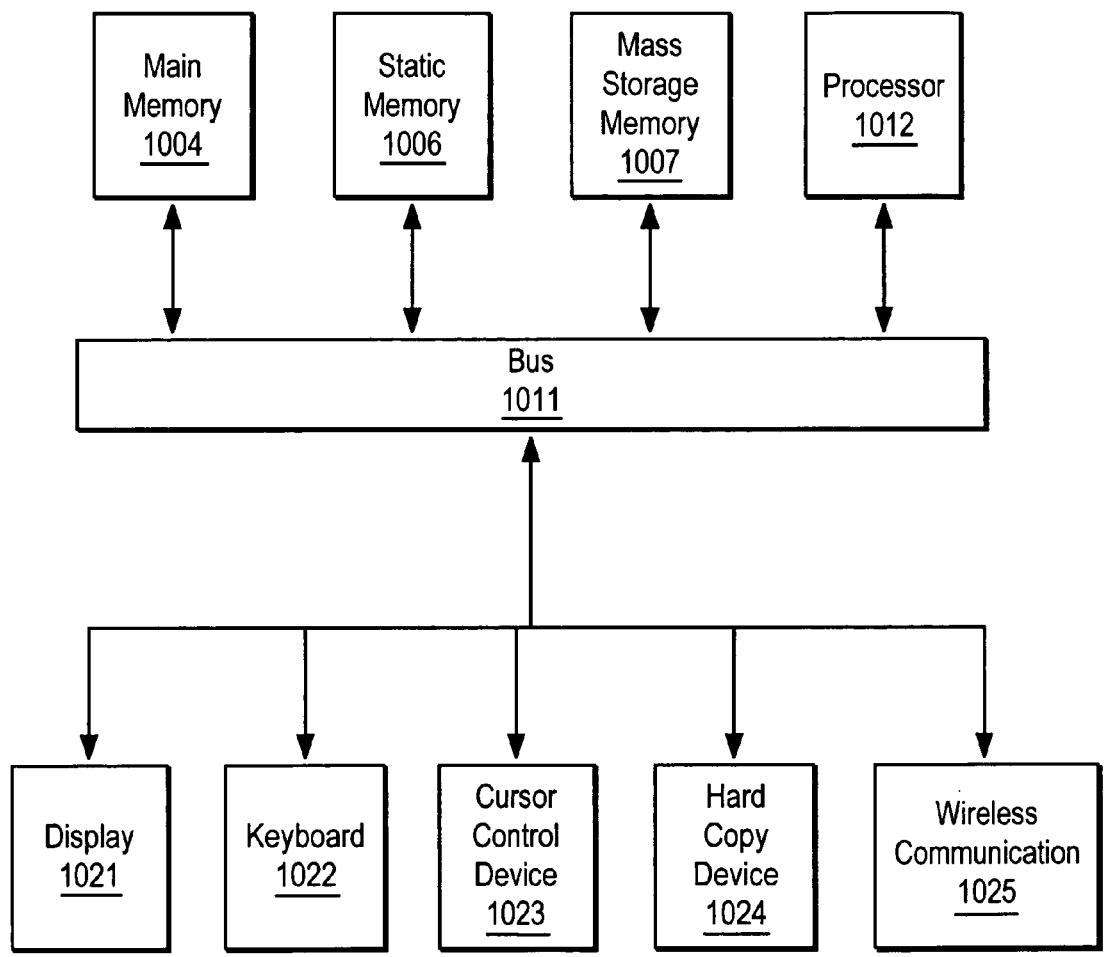
FIG. 10 is a block diagram of one embodiment of a computer system.

FIG. 10 is a block diagram of an exemplary computer system that may perform one or more of the operations described herein. Referring to FIG. 10, computer system 1000 may comprise an exemplary client or server computer system. The computer system may be part of a multi-function peripheral (MFP) that acts as a server for the JPIP/JPM files described above or an MFP that acts as a client.

Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, PowerPC™, Alpha™, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, track pad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for marking information on a medium such as paper, film, or similar types of media. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving a request for a region of a page of a document, the request being originated from a client, wherein the request uses JPIP syntax;
   accessing an auxiliary information file that contains location information for objects in a source file for the document, the auxiliary information file contains a list of all layout objects in the source file and is generated from the source file prior to the request and stored in a directory where the source file is stored, wherein the auxiliary information file contains, for each object in the source file for the document, page size information, spatial location information for the object on a page, a data reference number for the object that indicates whether the object is contained within the source file, and an offset in the source file of the codestream where each object is stored;
   determining, with a processor, one or more objects in the source file, based on the location information in the auxiliary information file, that intersect the region of the page, the source file having two or more codestreams; and
   sending a response having a subset of the information in the source file.

2. The method defined in claim 1 wherein the source file is a JPM file.

3. The method defined in claim 1 wherein the information comes from at least two different boxes in a JPM file.

4. The method defined in claim 1 wherein accessing information in the auxiliary information file comprises determining one or more layout objects in the source file that intersect the region of the page requested.

5. The method defined in claim 1 wherein the source file contains structural information for multiple file types, and further comprising sending the structural information of one of the multiple file types based on the request.

6. The method defined in claim 1 further comprising providing access to both JPM portions of the source file and PDF portions of the source file.

7. The method defined in claim 1 wherein the source file is a JPM file that contains a valid PDF file.

8. The method defined in claim 1 wherein the source file is a PDF file that contains a JPM file.

9. The method defined in claim 1 wherein the source file is a PDF file that contains a URL that allows a client to begin a JPIP interaction.

10. A server comprising:
    a network interface to receive a request for a region of a page of a document, the request being originated from a client, wherein the request uses JPIP syntax; and
    a processor to access an auxiliary information file that contains location information for objects in a source file for the document, determine one or more objects in the source file, based on the location information in the auxiliary information file, that intersect the region of the page, where the source file has two or more codestreams, the server causing a response to be sent through the network interface, the response having a subset of the information in the source file, wherein the auxiliary information file contains a list of all layout objects in the source file and is generated from the source file prior to the request and stored in a directory where the source file is stored, and wherein the auxiliary information file contains, for each object in the source file for the document, page size information, spatial location information for the object on a page, a data reference number for the object that indicates whether the object is contained within the source file, and an offset in the source file of the codestream where each object is stored.

11. The server defined in claim 10, wherein the auxiliary information file contains information that comes from at least two different boxes in a JPM file.

12. The server defined in claim 10, wherein the server determines one or more layout objects in the source file that intersect the region of the page requested by accessing information in the auxiliary information file.

13. The server defined in claim 10, wherein the source file contains structural information for multiple file types, and the server sends the structural information of one of the multiple file types based on the request.

14. A computer readable storage medium that provides instructions, which when executed on a processing system cause the processing system to perform a method comprising:
    receiving a request for a region of a page of a document, the request being originated from a client, wherein the request uses JPIP syntax;
    accessing an auxiliary information file that contains location information for objects in a source file for the document, the auxiliary information file contains a list of all layout objects in the source file and is generated from the source file prior to the request and stored in a directory where the source file is stored, wherein the auxiliary information file contains, for each object in the source file for the document, page size information, spatial location information for the object on a page, a data reference number for the object that indicates whether the object is contained within the source file, and an offset in the source file of the codestream where each object is stored;

determining, with a processor, one or more objects in the source file, based on the location information in the auxiliary information file, that intersect the region of the page, the source file having two or more codestreams; and sending a response having a subset of the information in the source file.

15. The computer readable storage medium defined in claim 14 wherein the auxiliary information file contains information that comes from at least two different boxes in a JPM file.

16. The computer readable storage medium defined in claim 14 wherein accessing information in the auxiliary information file comprises determining one or more layout objects in the source file that intersect the region of the page requested.

17. The computer readable storage medium defined in claim 14 wherein the source file contains structural information for multiple file types, and further comprising sending the structural information of one of the multiple file types based on the request.

18. The computer readable storage medium defined in claim 14 further comprising providing access to both JPM portions of the source file and PDF portions of the source file.

* * * * *